(12) United States Patent
Abadilla

(10) Patent No.: US 12,504,118 B1
(45) Date of Patent: Dec. 23, 2025

(54) SOAP SWIVEL CADDY

(71) Applicant: Arvin Abadilla, Carlsbad, CA (US)

(72) Inventor: Arvin Abadilla, Carlsbad, CA (US)

( * ) Notice: Subject to any disclaimer, the term of this patent is extended or adjusted under 35 U.S.C. 154(b) by 0 days.

(21) Appl. No.: 18/752,562

(22) Filed: Jun. 24, 2024

(51) Int. Cl.
 *F16M 13/02* (2006.01)

(52) U.S. Cl.
 CPC ................................. *F16M 13/022* (2013.01)

(58) Field of Classification Search
 CPC ...... F16M 13/022; F16M 13/00; F16M 13/02; F16L 3/13
 USPC ......................................................... 248/121
 See application file for complete search history.

(56) References Cited

U.S. PATENT DOCUMENTS

| | | | | |
|---|---|---|---|---|
| 3,194,526 A | * | 7/1965 | Lemmond | A47K 5/02 248/689 |
| 3,747,166 A | * | 7/1973 | Eross | F16L 3/24 403/188 |
| D253,457 S | * | 11/1979 | Sandel | D8/395 |
| 4,688,961 A | * | 8/1987 | Shioda | F16B 7/04 24/339 |
| 4,707,892 A | * | 11/1987 | Nelson | F16B 7/0433 24/336 |
| 5,288,047 A | * | 2/1994 | Pan | F21S 4/10 248/229.26 |
| D363,017 S | * | 10/1995 | Noble | D9/434 |
| D363,211 S | * | 10/1995 | Noble | D9/434 |
| 5,697,129 A | * | 12/1997 | Newville | B25F 1/02 24/339 |
| D394,801 S | * | 6/1998 | Blocher | D8/356 |
| 5,806,669 A | * | 9/1998 | Kim | B65D 83/285 206/349 |
| D440,005 S | * | 4/2001 | Blanton | 24/3.12 |
| 6,575,316 B2 | * | 6/2003 | Lin | A47K 10/38 211/205 |
| 7,021,324 B1 | * | 4/2006 | Clay | A61H 3/04 135/66 |
| 7,478,641 B2 | * | 1/2009 | Rousselet | A45D 40/24 132/318 |
| 8,083,432 B2 | * | 12/2011 | Limpert | F16L 3/16 24/336 |
| D660,690 S | * | 5/2012 | Mixides | D8/396 |
| D739,853 S | * | 9/2015 | Lee | D14/253 |
| 9,194,538 B2 | * | 11/2015 | Bulka | F16M 13/022 |
| 10,648,494 B1 | * | 5/2020 | Muhammad | F16B 2/22 |
| 10,882,472 B2 | * | 1/2021 | Adachi | F16L 3/13 |
| 11,168,836 B2 | * | 11/2021 | Kelly | F16B 7/0493 |
| 12,169,035 B2 | * | 12/2024 | Endara | B05B 15/65 |
| 2020/0032937 A1 | * | 1/2020 | Endara | F16L 3/223 |

* cited by examiner

*Primary Examiner* — Monica E Millner
(74) *Attorney, Agent, or Firm* — Eric Hanscom

(57) ABSTRACT

A soap swivel caddy has a large clamp that secures a soap container, and a small clamp that removably and rotably clamps to a faucet. The soap container can be swiveled to the back of the faucet when not in use. Both the small clamp and the large clamp have flexible clamping members that allow the invention to be used on a wide variety of sizes and shapes of soap containers and faucets. The invention is particularly suited for a boat, airplane, RV or travel trailer, wherein vertical and lateral movement of countertops is frequent.

3 Claims, 14 Drawing Sheets

SOAP SWIVEL CADDY

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND

Field of the Invention

The invention falls in the general field of kitchenware, and more specifically, to a swivel soap caddy that removably and rotationally secures soap containers to faucets and other vertical columns. The invention is suited for kitchens, and in particular to kitchens and bathrooms in boats, airplanes, RV's and travel trailers, where keeping soap containers on the kitchen and bathroom counters is difficult due to g-forces and uneven road undulations while in transit.

The clamps on both sides are flexible and allow the Soap Swivel Caddy to "snap" or attach to various faucets of different diameters. The larger clamp (as seen as the larger "C" on the unit) attaches to various soap bottle diameters.

Once attached to the faucet in an RV/campervan the Soap Swivel Caddy keeps the soap bottle in place and prevents it from falling off the RV kitchen counter top when the vehicle is in motion. It can swivel around the faucet for access to the soap bottle and swivel out of the way when not in use.

The invention is also used for boats and airplanes with kitchen and/or bathroom sink areas, where the inherent bumpiness/turbulence of water and air travel can cause any non-secured item to fall off a kitchen or bathroom countertop.

Prior Art. There are a number of patents and published patent applications that attempt to solve the problem that the current invention directly addresses: how to keep soap containers from falling off the kitchen and bathrooms of RV's when they are in motion.

For example, US20210363736A1 to Kohler Co. describes a Faucet with integrated soap dispenser. This publication teaches a faucet having an integrated dispensing device is provided. The faucet includes a center shaft centered on an axis, a handle portion extending away from the center shaft at a first angle and coupled to the center shaft, and a dispensing device rotatably coupled to the center shaft about the axis. The dispensing device includes a dispensing body and a dispensing arm. The dispensing body defines a first end proximate to the handle portion and a second end opposite the first end. The dispensing arm is coupled with the dispensing body and extends away from the dispensing body at a second angle, the second angle being the same as the first angle. This invention, however, has no reasonable means by which it can be easily attached to or removed from a faucet.

Similarly, US Design Pat. No. D441237 for a Soap Dish Holder, is one only one size, thereby limiting the size of soap containers it could hold. There are also no universal attachment means for attaching this invention to a faucet.

On in the same vein, US Design U.S. Pat. No. 898,555 for a Bathroom Holder is designed to hold a mirror and could not function to hold a soap container.

Finally, US Design U.S. Pat. No. 441,236 for a Soap-dish holder has only a single size of its version of the "large clamp" and appears to work by suction to hold it to a bathroom wall, rather than using a small clamp to rotably attach it to a faucet.

SUMMARY OF THE INVENTION

This summary is provided to introduce concepts related to soap container retaining devices for countertops. The concepts are further described below in the detailed description. This summary is not intended to identify key features or essential features of the claimed subject matter, nor is it intended to be used to limit the scope of the claimed subject matter.

The present disclosure relates to a device that can retain a container of soap for a faucet. As an RV drives around, or a vehicle haul a trailer, any irregularities in the road is translated into vertical and horizontal movements that can topple cabinets, open unsecured refrigerator doors, and slide anything not secured off a kitchen or bathroom top. Similarly, many larger boats have kitchens and bathroom sinks where the frequent movement of the boat can cause any non-secured item on a countertop to fall off. Finally, airlines with food preparation areas and bathroom sinks often encounter turbulence that can also result in non-secured items ending up and being spilled on the plane floor. The invention is a swivel soap caddy that can be removably attached to a soap container and a faucet, which removably secures soap containers to faucets and other vertical columns. This makes the invention well suited for kitchens, and in particular to kitchens and bathrooms in RVs and trailers, where road bumps can cause anything not secured to a table to end up on the floor of the RV or trailer.

The invention has two clamps, one on each side of a middle point. The two clamps can meet either directly, or be separated by a core. The clamps on both sides are flexible and allow the Soap Swivel Caddy to "snap" or attach to various faucets of different diameters with the smaller clamp. The larger clamp attaches to various soap bottle diameters.

Once the smaller clamp is attached to the faucet in an RV/campervan the invention keeps the soap bottle in place and prevents it from falling off the RV kitchen counter top when the vehicle is in motion. It can swivel around the faucet for access to the soap bottle and swivel out of the way for a tidy countertop when not in use.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The soap swivel caddy may, however, be embodied in many different forms and should not be construed as being limited to the embodiments set forth herein; rather, these embodiments are provided by way of illustration only and so that this disclosure will be thorough, complete and fully convey understanding to those skilled in the art.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and methods that are consistent with the subject matter as claimed herein, wherein:

Figure 1:
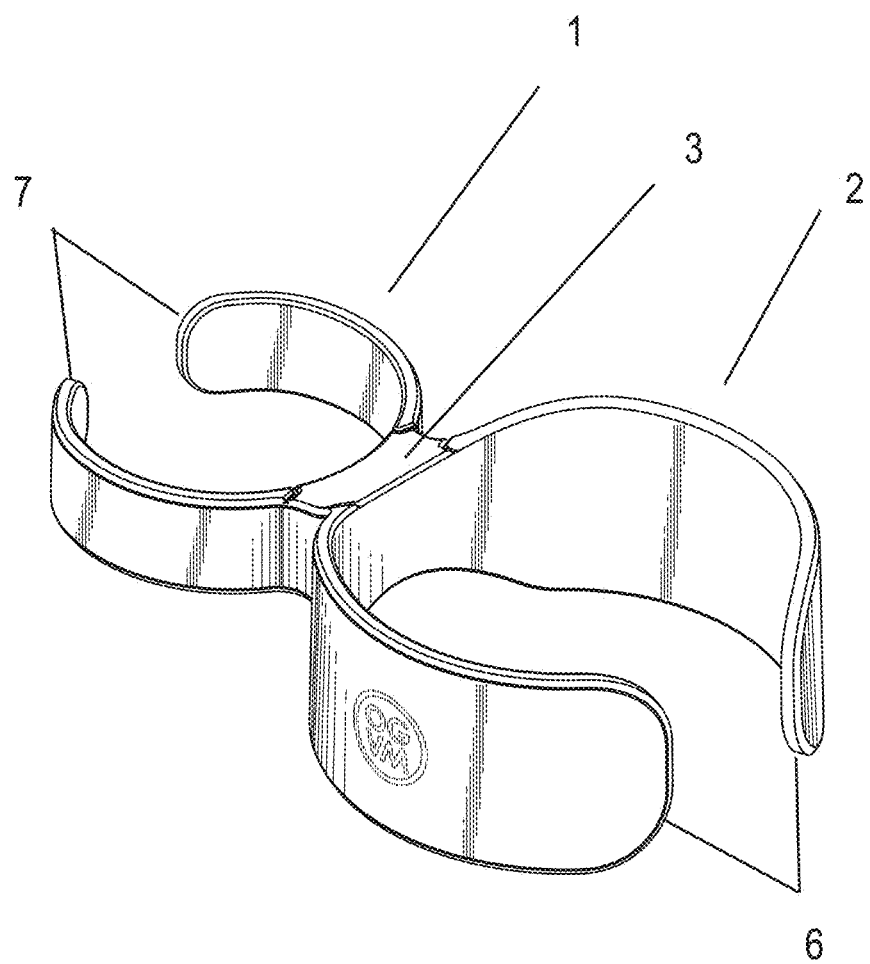
FIG. 1 is a perspective of the invention showing its key parts.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The detailed description of various exemplary embodiments of the disclosure is described herein with reference to the accompanying drawings. It should be noted that the embodiments are described herein in such details as to clearly communicate the disclosure. However, the amount of details provided herein is not intended to limit the anticipated variations of embodiments; on the contrary, the intention is to cover all modifications, equivalents, and alternatives falling within the spirit and scope of the present disclosure as defined by the appended claims.

It is also to be understood that various arrangements may be devised that, although not explicitly described or shown herein, embody the principles of the present disclosure. Moreover, all statements herein reciting principles, aspects, and embodiments of the present disclosure, as well as specific examples, are intended to encompass equivalents thereof.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may, in fact, be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It would be desirable to have a device that can effectively secure a soap container to a faucet where the vehicle/boat containing the faucet is subject to substantial movement during travel.

To this, the present disclosure advantageously fills the above-mentioned needs and addresses the aforementioned deficiencies by providing a soap swivel caddy that has a large clamp that secures a soap container, and a small clamp that rotably clamps to a faucet. The soap container can be swiveled to the back of the faucet when not in use. Both the small clamp and the large clamp have flexible clamping members that allow the invention to be used on a wide variety of sizes and shapes of soap containers and faucets. The invention is particularly suited for a boat, RV or travel trailer, where vertical and lateral movement of countertops is frequent.

FIG. 1 is a perspective of the invention showing its key parts. The caddy has a large clamp 2 has two large clamping members 6 which secure a wide variety of soap containers. It also has a small clamp 1, which has two small clamping members 7 which allow a user to snap the invention around a faucet. Connecting the small clamp 1 and the large clamp 2 is a core 3.

Figure 2:
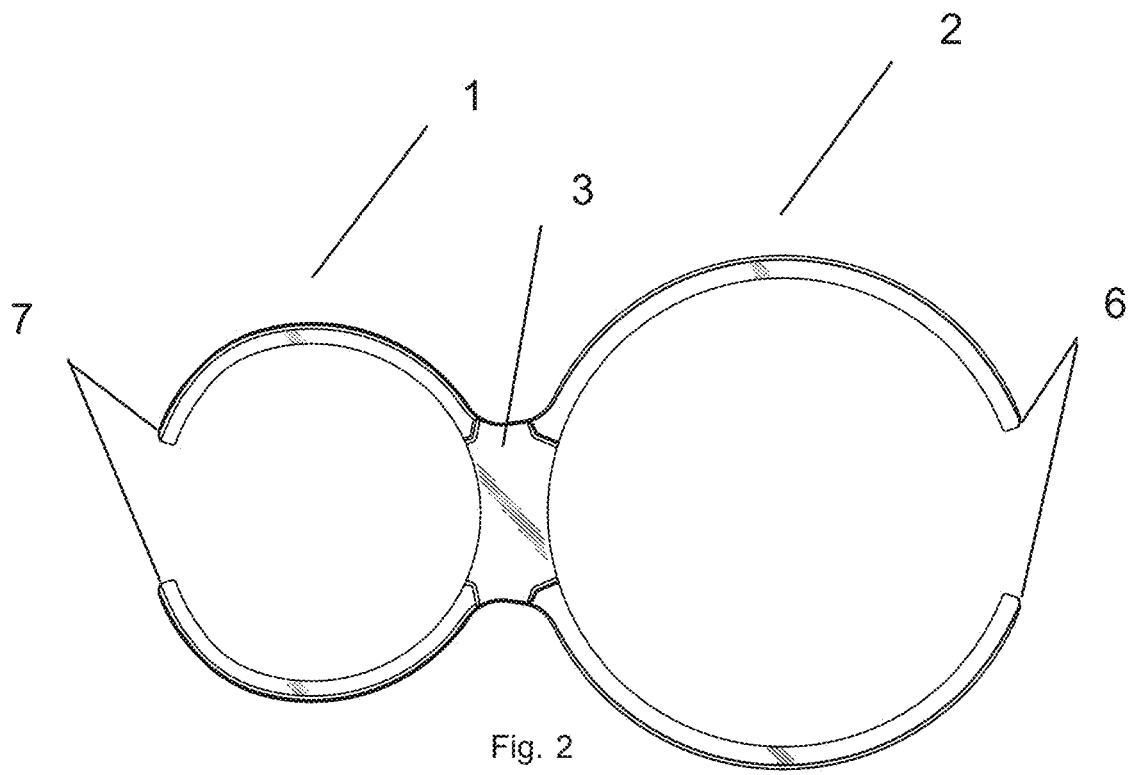
FIG. 2 is a top view of the invention.

FIG. 2 is a top view of the invention.

Figure 3:
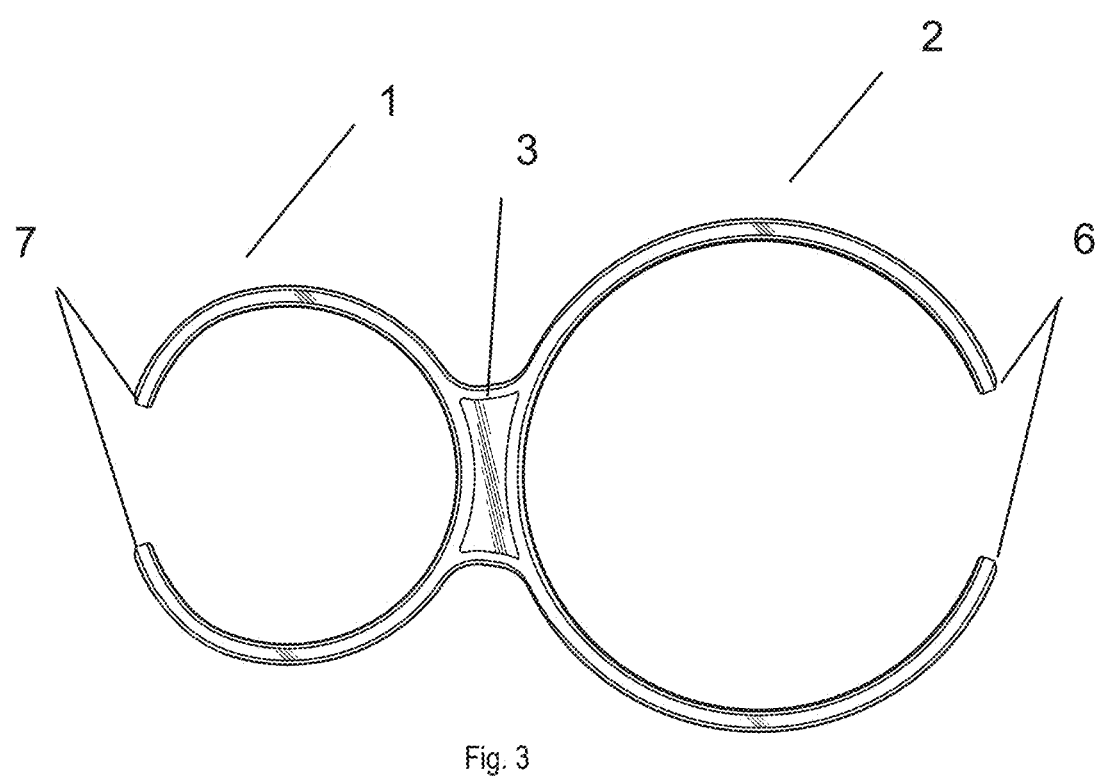
FIG. 3 is a bottom view of the invention.

FIG. 3 is a bottom view of the invention.

Figure 4:
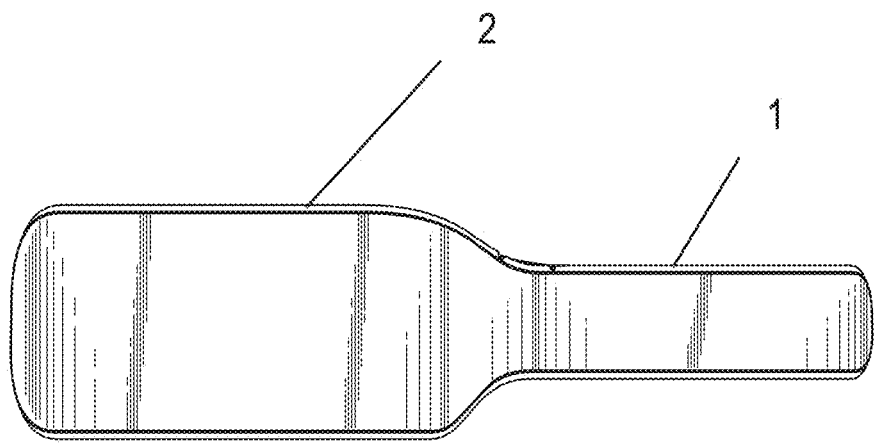
FIG. 4 is a right-side view of the invention.

FIG. 4 is a right-side view of the invention.

Figure 5:
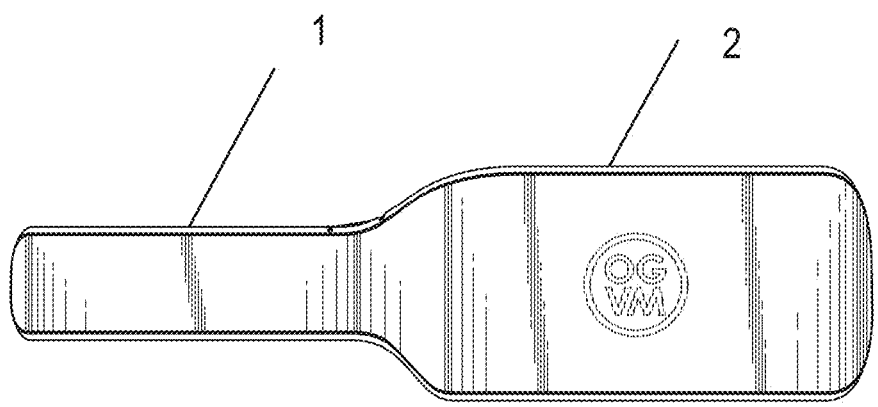
FIG. 5 is left side view of the invention.

FIG. 5 is left side view of the invention.

Figure 6:
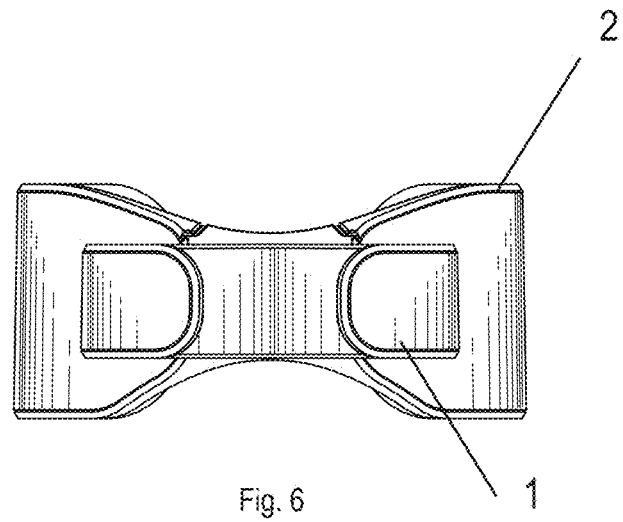
FIG. 6 is a back view of the invention.

FIG. 6 is a back view of the invention.

Figure 7:
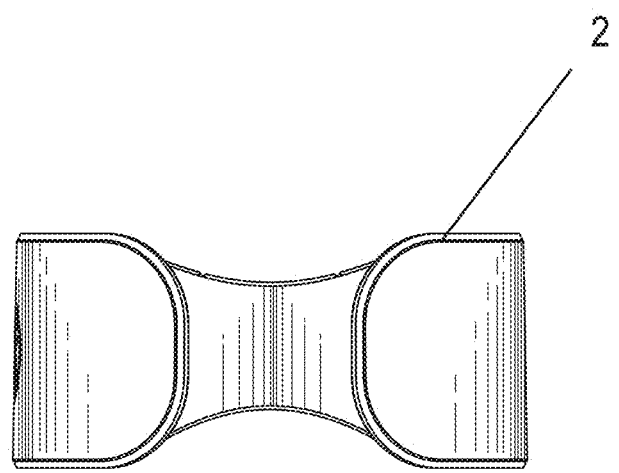
FIG. 7 is a front view of the invention.

FIG. 7 is a front view of the invention.

Figure 8:
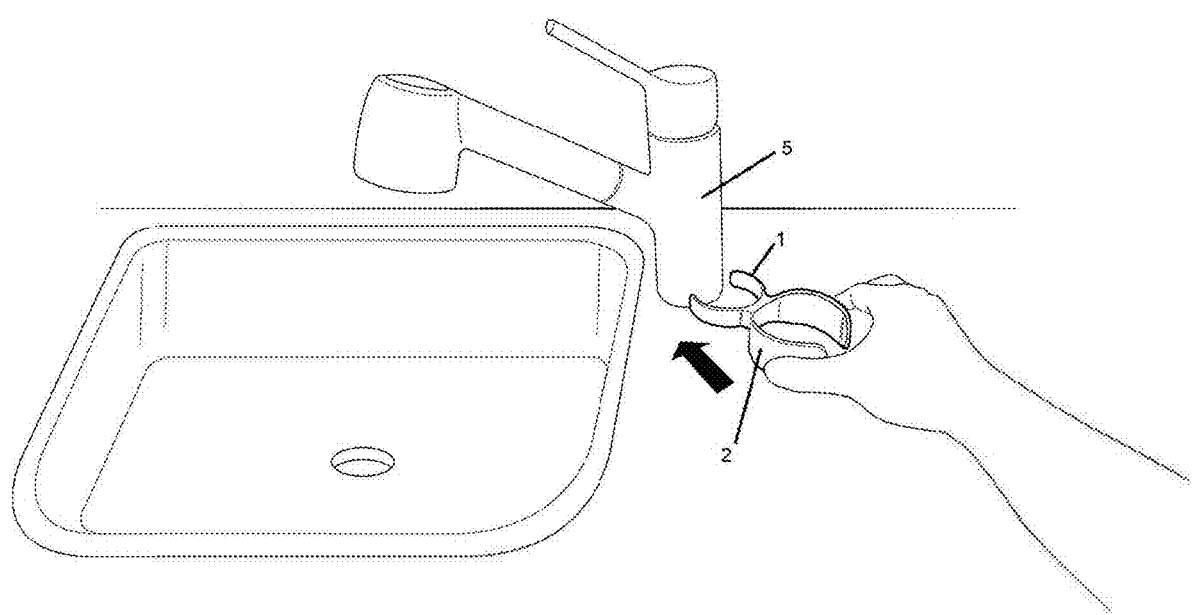
FIG. 8 is a perspective; side view of the invention being used to rotably secure a container of soap to a faucet.

FIG. 8 is a perspective; side view of the invention being used to rotably secure a container of soap to a faucet. is a perspective, side view of the invention being used to rotably secure a container of soap 4 to a faucet 5. The soap swivel caddy has a small clamp 1, that rotably and removably attaches to a wide variety of faucets 5 with different diameters and different shapes. A large clamp 2 has two large clamping members which secure a wide variety of soap containers Connecting the small clamp 1 and the large clamp 2 is a core 3. To use the invention, a user merely snaps a soap container in between the two large clamping members of the large clamp, then snaps the small clamp around a faucet. When the soap container is not in use, the user can rotate it back behind the faucet where it is not in the way of food preparation, doing dishes, etc. The invention is particularly suitable for boats with kitchen/bathroom sinks and RV's/ travel trailers, as a countertop in any of these vehicles has a problem of things falling off countertops when the vehicle is in motion.

Figure 9:
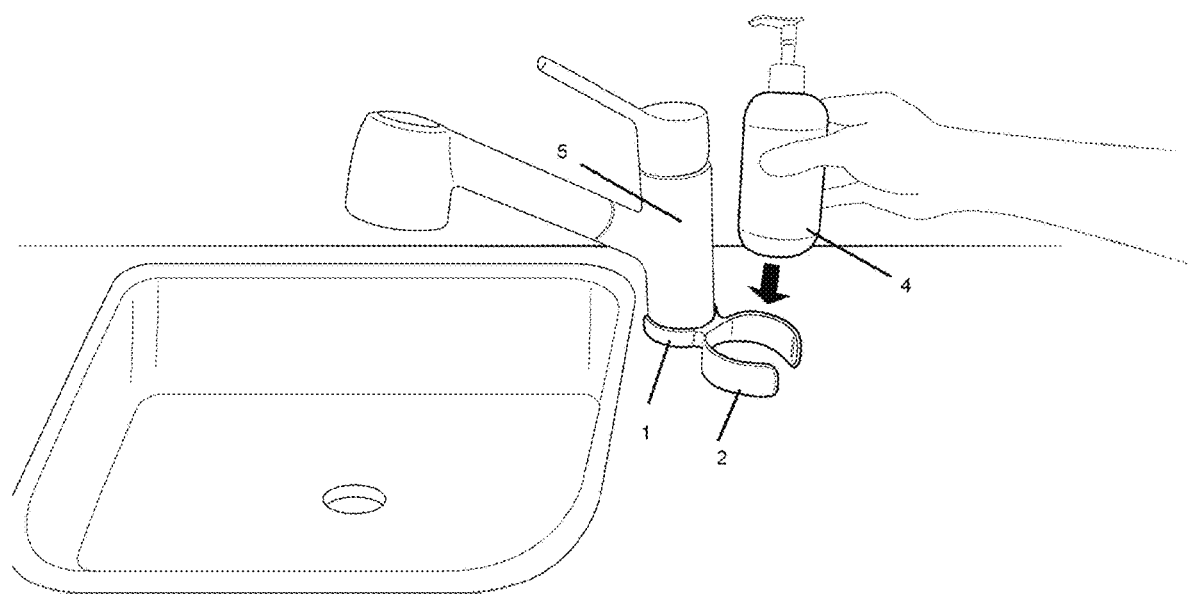
FIG. 9 is a perspective; side view of the invention being used to rotably secure a container of soap to a faucet.

FIG. 9 is a perspective; side view of the invention being used to rotably secure a container of soap to a faucet. In this figure, the soap container 4 is being inserted into the large clamp 2.

Figure 10:
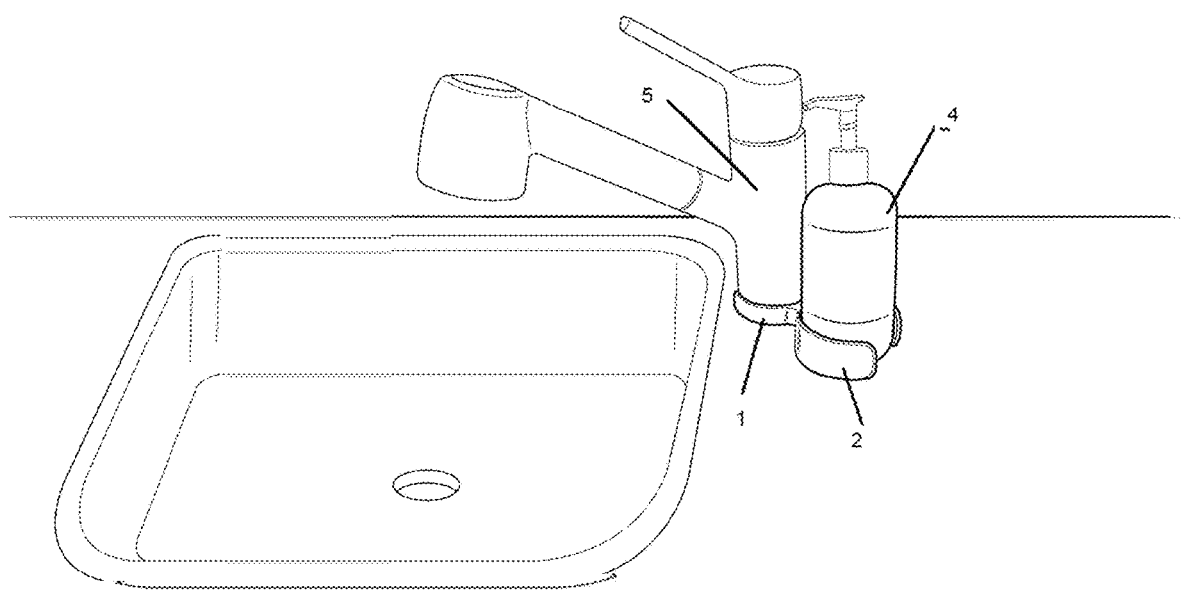
FIG. 10 is a perspective; side view of the invention being used to rotably secure a container of soap to a faucet.

FIG. 10 is a perspective; side view of the invention being used to rotably secure a container of soap to a faucet. In this figure, the soap container 4 has been secured within the large clamp 2.

Figure 11:
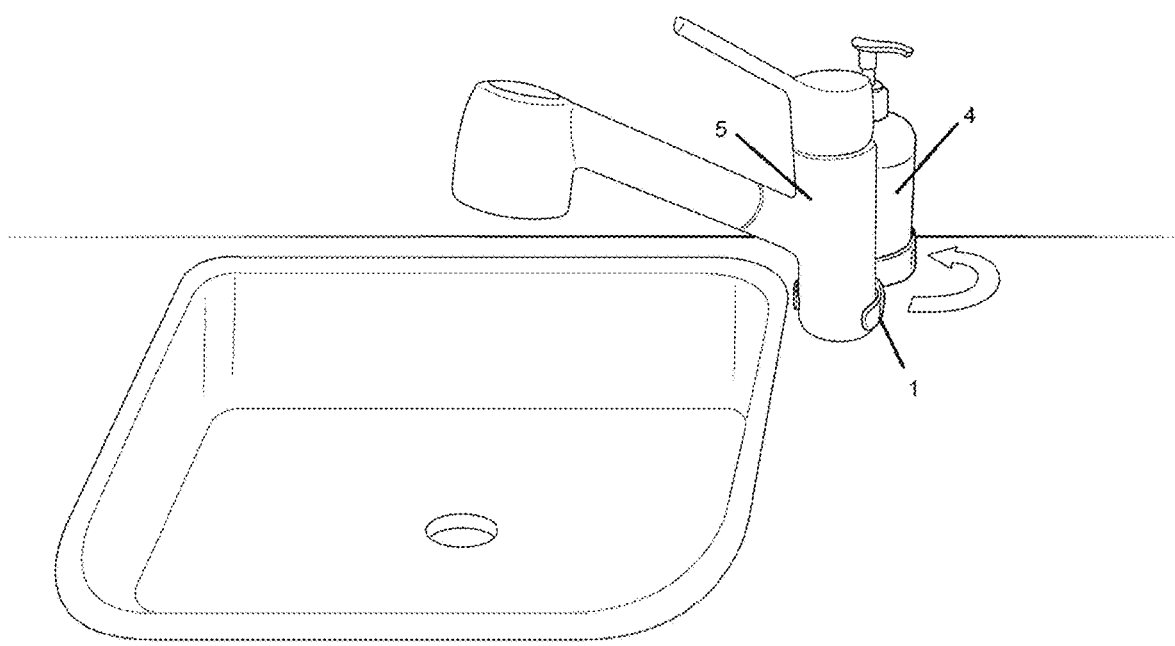
FIG. 11 is a perspective; side view of the invention being used to rotably secure a container of soap to a faucet.

FIG. 11 is a perspective; side view of the invention being used to rotably secure a container of soap to a faucet. In this figure, the soap container 4 and large clamp 2 have been rotated back behind the faucet 5 for secure placement when the soap is not in use.

Figure 12:
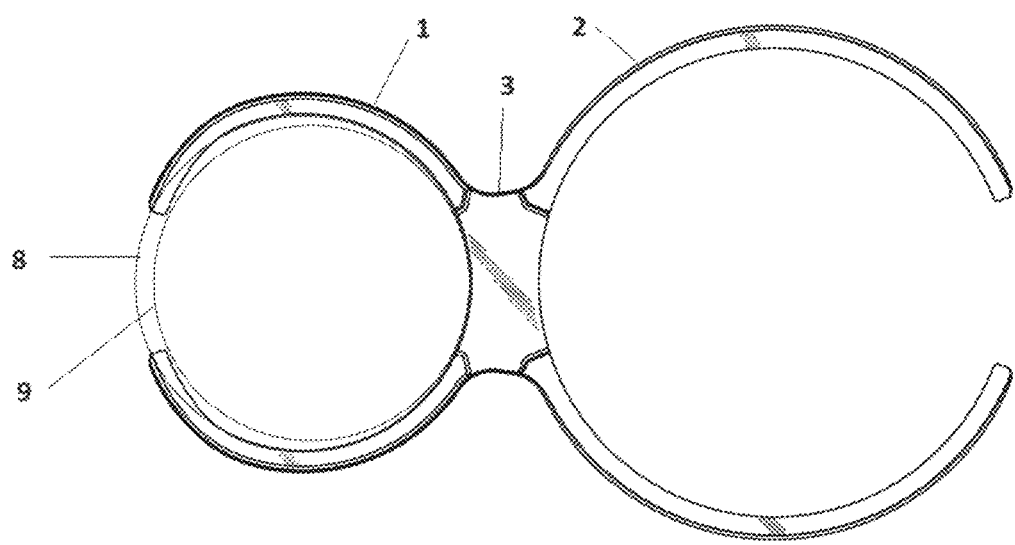
FIG. 12 is a top view showing the unique curvature of the small clamp.

FIG. 12 is a top view showing the unique curvature of the small clamp. The Small clamp 1 is not not shaped in a perfect circle, but rather, extends slightly outside of the circle on an upper and lower portion, but then bends back inside of the circle at the small clamping member tips 12. This allows for a firmer grip on a wider range of sizes and shapes of faucets.

Figure 13:
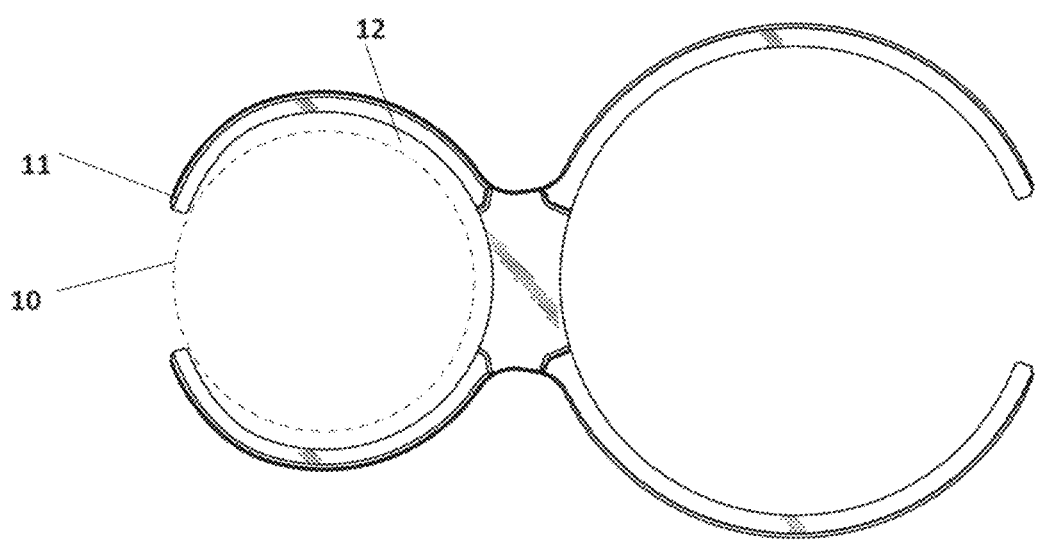
FIG. 13 is a top view showing the unique curvature of the small clamp from a different form of measure and illustration.

FIG. 13 is a top view showing the unique curvature of the small clamp from a different form of measure and illustration. In this illustration, the curvature roughly follows a circle until the small clamping member tip 12, at which point it bends inside of the circle.

Figure 14:
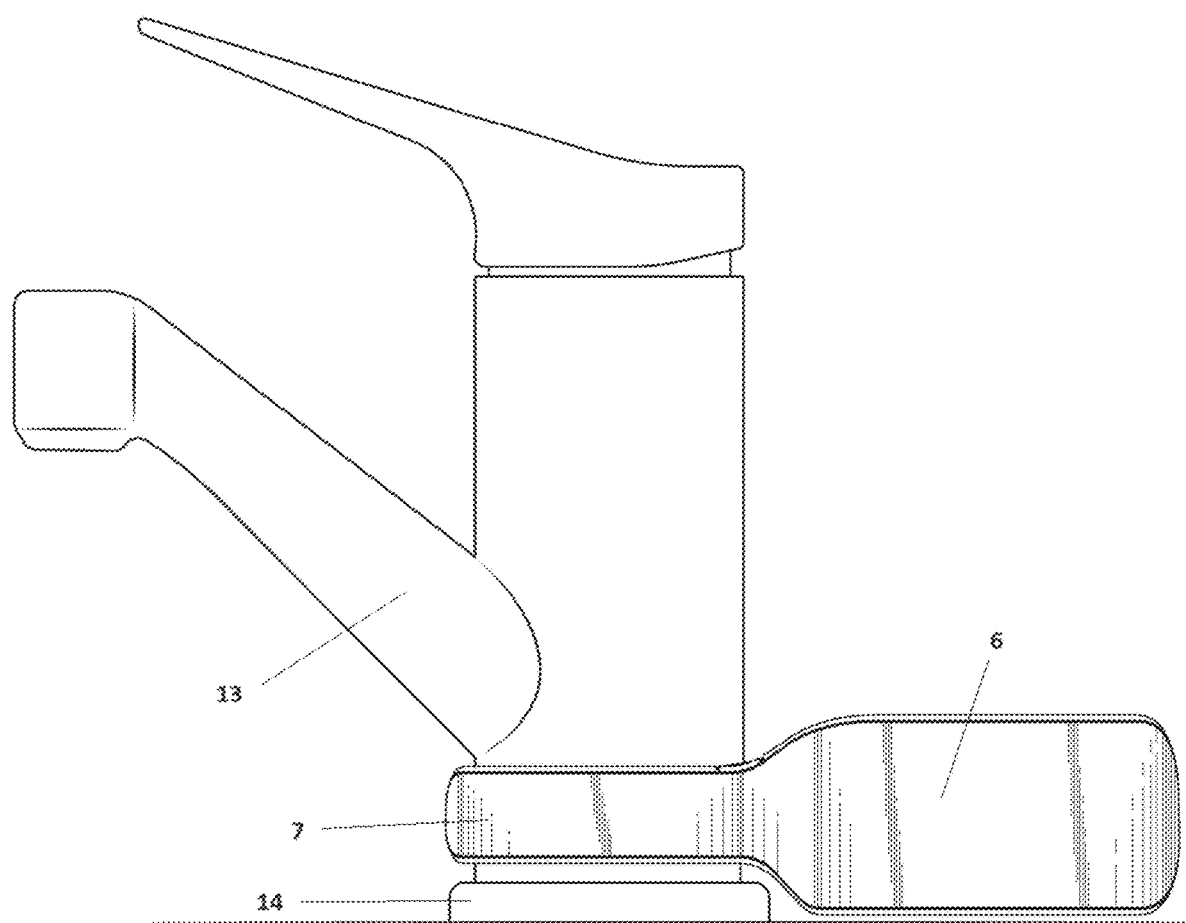
FIG. 14 is a side view showing the small clamp fitting between a faucet spigot and a faucet base.

FIG. 14 is a side view showing the small clamp fitting between a faucet spigot and a faucet base. The small clamp 1 is shorter in height than the large clamp 2, and is located in the approximate middle of the large clamp. This leaves space at the bottom of the small clamp to accommodate the faucet base 14, and at the top to accommodate the faucet spigot 13.

Figure 15:
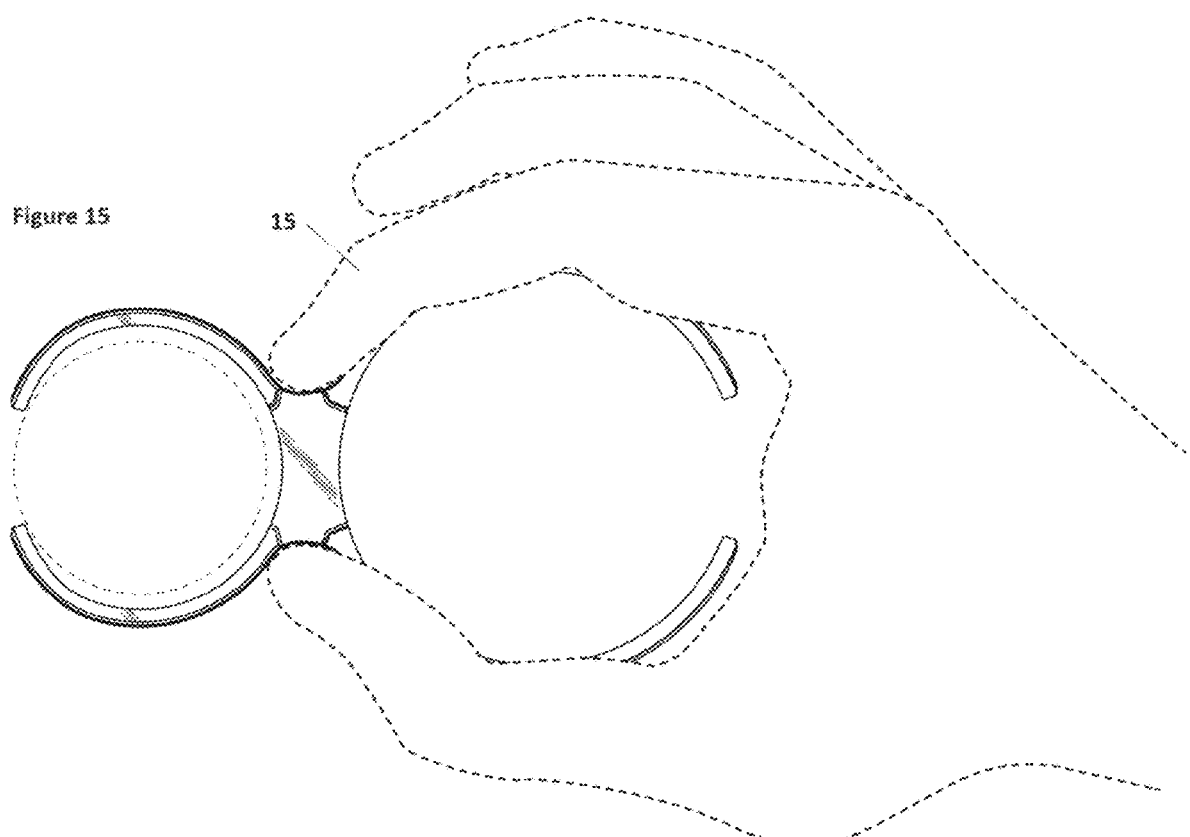
FIG. 15 is a top view showing how the small clamp is clipped around a faucet with the user's fingers grasping the core.

FIG. 15 is a top view showing how the small clamp 2 is clipped around a faucet with the user's fingers grasping the core 3. This allows a user to easily attach and remove the small clamp from a faucet.

Figure 16:
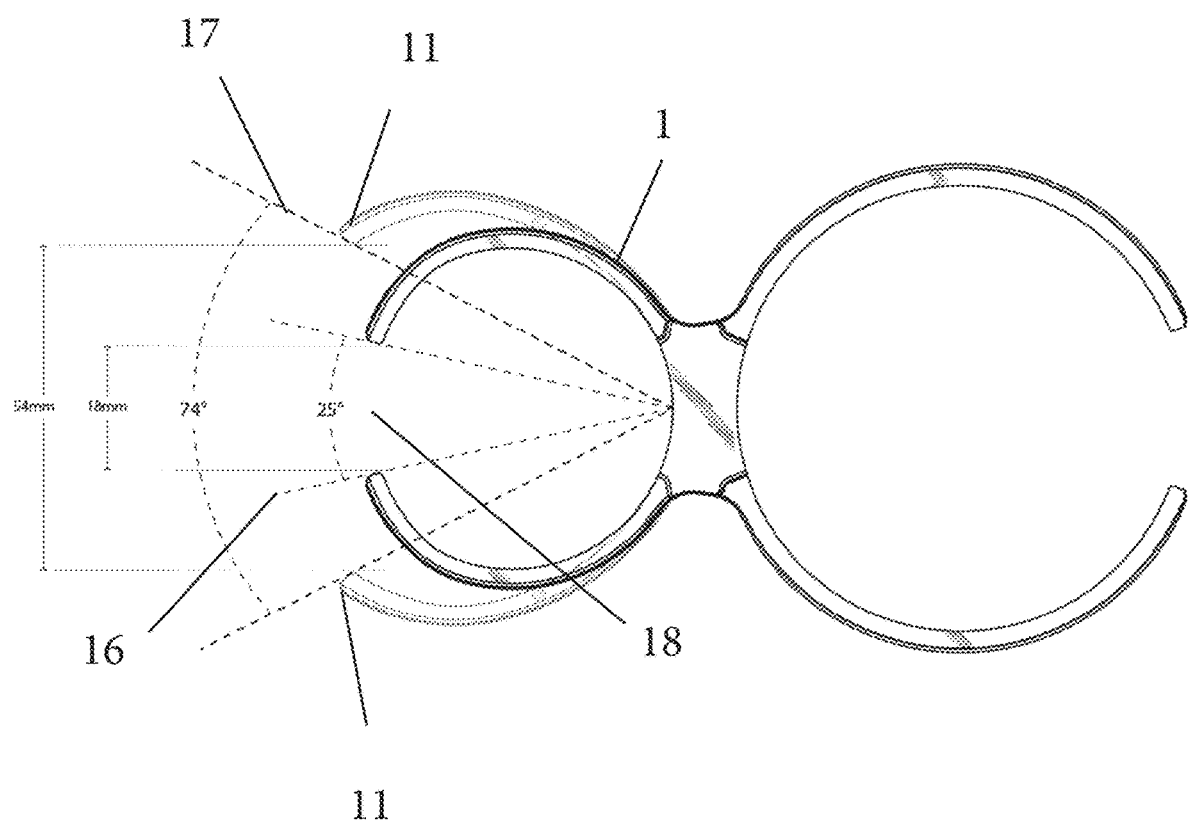
FIG. 16 is a top view showing how the small clamping members can bend out to accommodate a wide range of faucet sizes and shapes.

FIG. 16 is a top view showing how the small clamping members 7 can bend out to accommodate a wide range of faucet sizes and shapes. In a resting position 15, the two small clamping members are separated by a resting space of approximately 25 degrees or 18 mm. As the small clamp is snapped around the faucet, the small clamping members are spread outward to an extended position 16, which can range up to 74 degrees or 54 mm. Because of the unique shape of the small clamp, the device can be attached a number of different faucet sizes and shapes, thereby make the invention a "one stop shop" for attaching soap containers to a wide variety of faucets in RV's, travel trailers, boats and airplanes.

Figure 17:
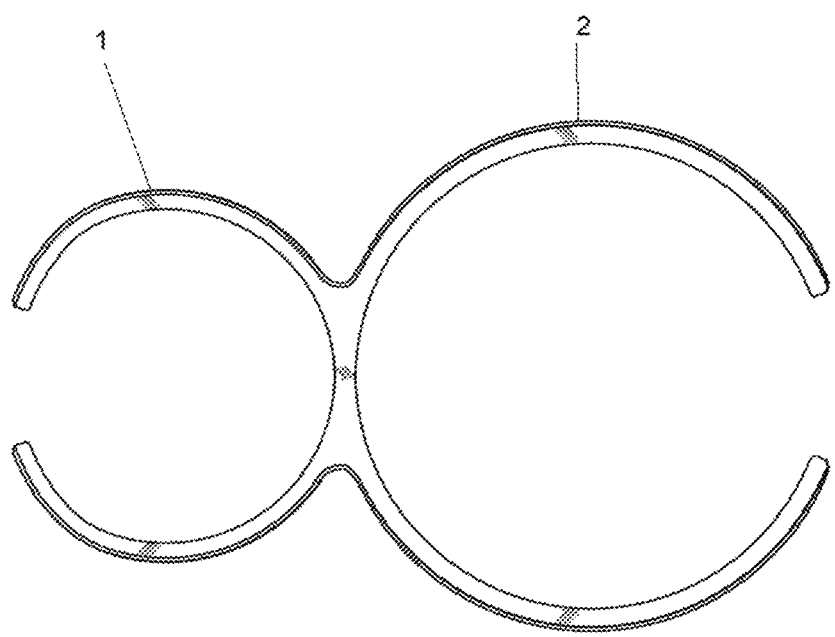
FIG. 17 is a top view of an embodiment where the small clamp and the large clamp meet directly, without having a core in the middle.

FIG. 17 is a top view of an embodiment where the small clamp 1 and the large clamp 2 meet directly, without having a core in the middle.

In a preferred embodiment, the invention provides a soap swivel caddy with a large clamp with two large clamp members, a small clamp with two small clamp members, a core, wherein the large clamp is connected to the small clamp by the core. The small clamp has a small clamp thickness and the small clamp thickness is consistent from the a small clamp core connection to a small clamp tip, wherein the small clamp thickness causes an evenly distributed small clamp clamping force, wherein the large clamp has a large clamp thickness and the large clamp thickness is consistent from the a large clamp core connection to a large clamp tip, wherein the large clamp thickness causes an evenly distributed large clamp clamping force.

The small clamp is offset to the large clamp and the small clamp is joined to an approximate middle location of the larger clamp by the core; this allows the small clamp to effectively snap around faucet and effectively snap above a faucet base and below a faucet spigot. The small clamp can be rotated to store the soap container behind the faucet when not in use.

The large clamp consists of two large clamping members, wherein each of the two large clamping members has the large clamping member tip and the small clamp consists of two small clamping members, wherein each of the two small clamping members has the small clamping member tip. The small clamp has a decreasing radius, which allows it to grip rotably but tightly a wide variety of faucet sizes and shapes. The core is non-flexible, and has a finger grip portion, wherein a user can grasp the soap swivel caddy by the core for insertion and removal. The large clamp can accept and secure a soap container bounded by the two large clamping members. Because of the curvature of the large clamping members, the invention can secure a wide range of soap container sizes and shapes.

The small clamp has two small clamp clamping members which are separated by a small clamp opening: thus, the small clamp opening has a resting position and an extended position. The resting position is approximately 25 degrees or 18 mm, while the extended position is approximately 74 degrees or 54 mm.

Furthermore, those skilled in the art can appreciate that the above description does not provide specific details of the manufacture or design of the various components. Those of skill in the art are familiar with such details, and unless departures from those techniques are set out, techniques, known, related art or later developed designs and materials should be employed. Those in the art can choose suitable manufacturing and design details.

Further, the terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCE NUMBERS USED

1. Small clamp
2. Large clamp
3. Core
4. Soap container
5. Faucet
6. Large clamping member
7. Small clamping member
8. Outer Circle
9. Inner Circle 10. Circle
11. Small clamping member tip
12. Space
13. Faucet spigot
14. Faucet base
15. User's fingers
16. Resting position
17. Extended position
18. Small clamp opening

What is claimed is:

1. A soap swivel caddy, consisting of: a large clamp with two large clamp members, a small clamp with two small clamp members, a core, wherein the large clamp is connected to the small clamp by the core,
   wherein the small clamp has a small clamp thickness, and the small clamp thickness is consistent from a small clamp core connection to a small clamp tip, wherein the small clamp thickness causes an evenly distributed small clamp clamping force,
   wherein the large clamp has a large clamp thickness, and the large clamp thickness is consistent from a large clamp core connection to a large clamp tip, wherein the large clamp thickness causes an evenly distributed large clamp clamping force,
   wherein the small clamp is offset to the large clamp, wherein the small clamp has a small clamp height, and the small clamp height is approximate a large clamp height, and wherein the small clamp is joined to an approximate middle location of the larger clamp by the core, wherein this location allows the small clamp to effectively snap around faucet and effectively snap above a faucet base and below a faucet spigot,
   wherein the large clamp consists of two large clamping members, wherein each of the two large clamping members has the large clamping member tip,
   wherein the small clamp consists of two small clamping members, wherein each of the two small clamping members has the small clamping member tip,
   wherein the core is non-flexible, wherein the core has a finger grip portion, wherein a user grasps the soap swivel caddy by the core for insertion and removal,
   wherein the small clamp has two small clamp clamping members which are separated by a small clamp opening,
   wherein the small clamp opening has a resting position and an extended position,
   wherein the large clamp can accept and secure a soap container as bounded by the two large clamping members,
   wherein the soap swivel caddy is rotated around the faucet by a user such that the soap container is located behind the faucet when the soap container is not in use.

2. The soap swivel caddy of claim 1, wherein the resting position is approximately 25 degrees and wherein the extended position has a maximum extension of 74 degrees, wherein the resting position is approximately 18 mm and wherein the extended position has a maximum extension of 54 mm.

3. A soap swivel caddy, consisting of: a large clamp with two large clamp members, a small clamp with two small clamp members, wherein the large clamp is connected to the small clamp,
   wherein the small clamp has a small clamp thickness, and the small clamp thickness is consistent from a small clamp/large clamp connection to a small clamp tip, wherein the small clamp thickness causes an evenly distributed small clamp clamping force,
   wherein the large clamp has a large clamp thickness, and the large clamp thickness is consistent from a large clamp/small clamp connection to a large clamp tip, wherein the large clamp thickness causes an evenly distributed large clamp clamping force,
   wherein the small clamp is offset to the large clamp, wherein the small clamp has a small clamp height, and the small clamp height is approximate a large clamp height, and wherein the small clamp is joined to an approximate middle location of the larger clamp by the core, wherein this location allows the small clamp to effectively snap around faucet and effectively snap above a faucet base and below a faucet spigot,
   wherein the large clamp consists of two large clamping members, wherein each of the two large clamping members has the large clamping member tip,
   wherein the small clamp consists of two small clamping members, wherein each of the two small clamping members has the small clamping member tip,
   wherein the small clamp has two small clamp clamping members which are separated by a small clamp opening,
   wherein the small clamp opening has a resting position and an extended position,
   wherein the large clamp can accept and secure a soap container as bounded by the two large clamping members,
   wherein the soap swivel caddy is rotated around the faucet by a user such that the soap container is located behind the faucet when the soap container is not in use,
   wherein the resting position is approximately 25 degrees and wherein the extended position has a maximum extension of 74 degrees, wherein the resting position is approximately 18 mm and wherein the extended position has a maximum extension of 54 mm.

* * * * *